United States Patent [19]

Leiby, Jr. et al.

[11] 4,059,813
[45] Nov. 22, 1977

[54] COHERENT COUNTER-STREAMING ELECTROSTATIC WAVE RAMAN INTERACTION SYSTEM UTILIZING OPPOSING ELECTRON BEAMS FOR THE PRODUCTION OF COHERENT MICROWAVES IN PLASMAS

[76] Inventors: Clare C. Leiby, Jr., 229 Old Billercia Road, Bedford, Mass. 01730; Balram Prasad, 56 William St., West Newton, Mass. 02165

[21] Appl. No.: 758,877

[22] Filed: Jan. 12, 1977

[51] Int. Cl.² ............................................. H03B 17/00
[52] U.S. Cl. .................................. 331/94; 313/231.6; 315/111.9; 325/101
[58] Field of Search ....................... 331/94; 313/231.6; 315/111, 111.8, 111.9; 250/396, 492, 493, 503; 325/101, 105

[56] References Cited
U.S. PATENT DOCUMENTS 3,944,946  3/1976  Prasad et al. .......................... 331/94

Primary Examiner—John Kominski
Attorney, Agent, or Firm—Joseph E. Rusz; Sherman H. Goldman

[57] ABSTRACT

The generation of controlled, electromagnetic, coherent, microwave radiation from a warm, uniform plasma at approximately twice the electron plasma frequency by means of two oppositely directed streams of high energy electrons and the coupling of the resulting coherent, electromagnetic radiation from a cavity resonator into external circuitry, wherein the two opposing streams of high energy electrons directed into the warm, uniform plasma result in a conversion of electron beam and plasma energies into transverse electromagnetic radiation from 10 to 100 times that which is possible with a single electron beam-plasma system.

7 Claims, 4 Drawing Figures

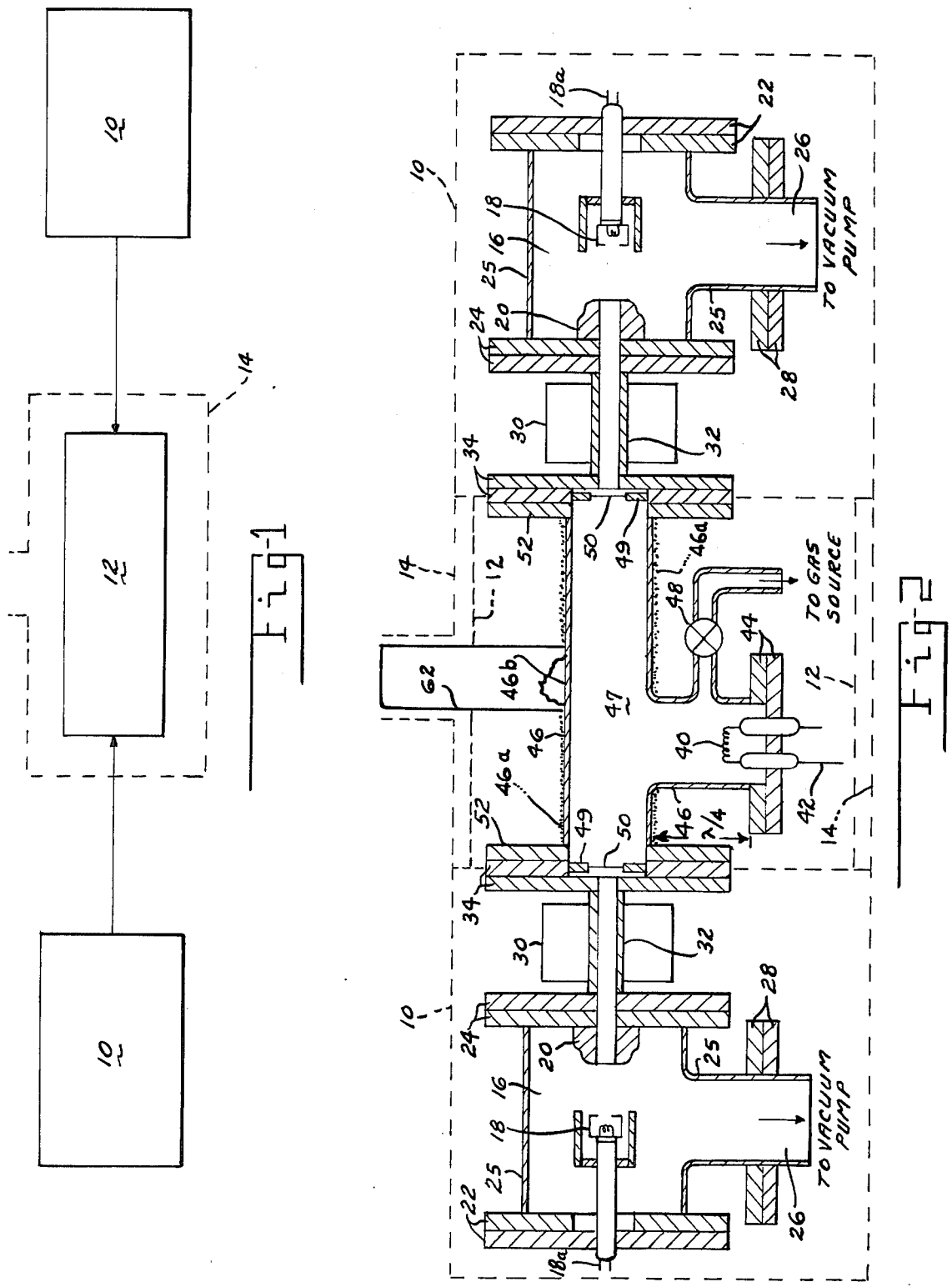

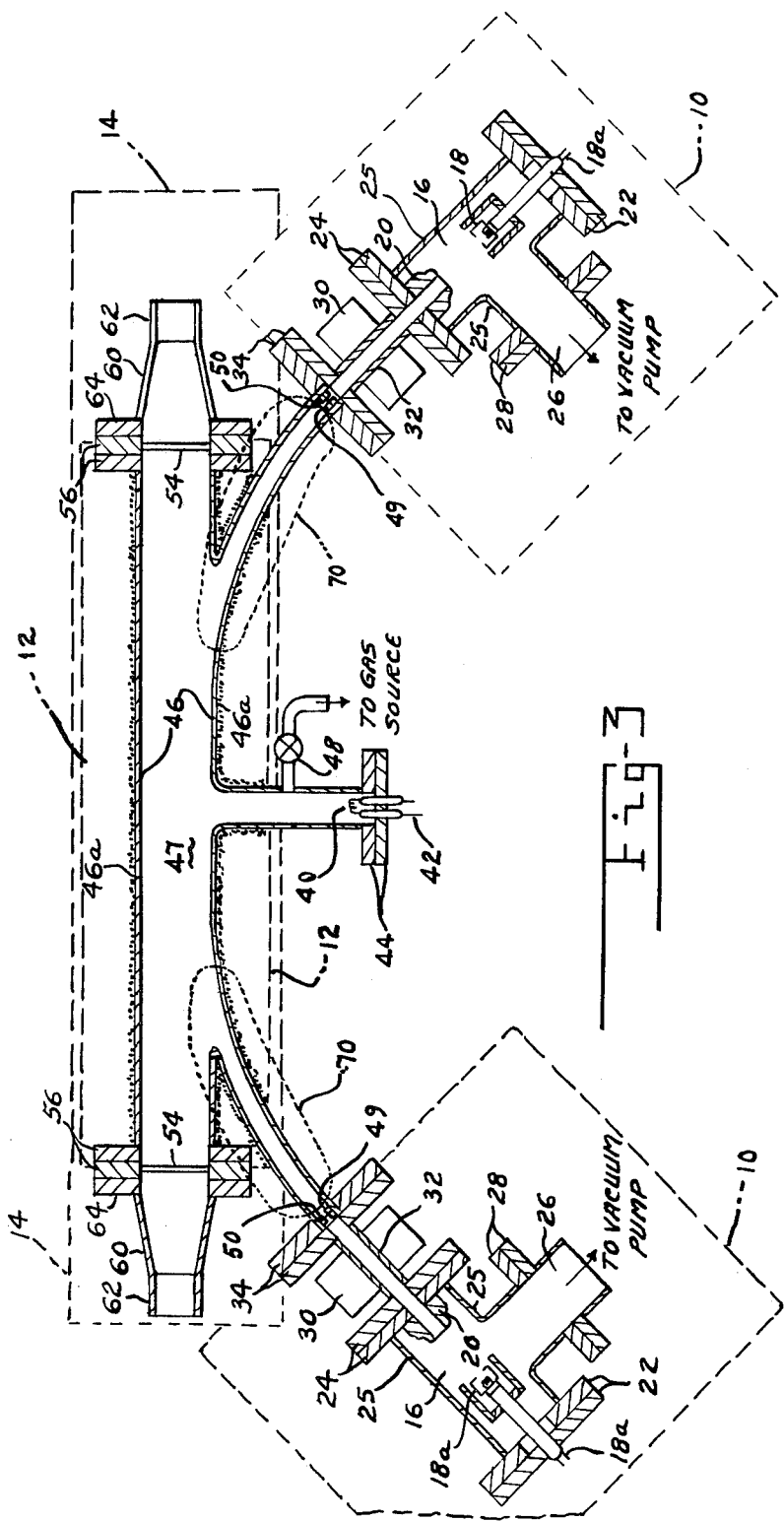

COHERENT COUNTER-STREAMING ELECTROSTATIC WAVE RAMAN INTERACTION SYSTEM UTILIZING OPPOSING ELECTRON BEAMS FOR THE PRODUCTION OF COHERENT MICROWAVES IN PLASMAS

STATEMENT OF GOVERNMENT INTEREST

The invention described herein may be manufactured and used by or for the Government for governmental purposes without payment of any royalty thereon.

BACKGROUND OF THE INVENTION

This invention relates generally to microwave, electromagnetic radiation and more particularly to a method and apparatus for producing controlled, coherent microwave radiation from a warm, uniform plasma at approximately twice the electron plasma frequency.

As was pointed out in our U.S. Pat. No. 3,944,946 issued on 16 Mar. 1976, and an article in THE PHYSICS OF FLUIDS Vol. 19, No. 3, of March 1976 pages 464–478 by Balram Prasad, an electron beam propagating through a plasma generates quasi-stable longitudinal electrostatic (plasma) waves peaked at electron plasma frequency via the two-stream instability mechanism. These plasma waves are scattered by both mass (ion density) and charge (electron density) inhomogeneities or fluctuations (at ion and electron plasma frequencies, respectively) which are always present in a warm plasma.

Scattering by mass density fluctuations of the incident or "pump" electrostatic waves builds up a coherent background field of scattered plasma waves via the Rayleigh scattering process. Consequently, the charge density fluctuations are coherently enhanced.

Scattering of pump waves by the coherently enhanced charge density fluctuations (Raman scattering) results in the conversion of both the electrostatic pump waves and the charge density fluctuations into coherent transverse electromagnetic waves. The frequency of this transverse radiation is the sum of the frequencies of the pump waves and the Rayleigh scattered background waves, i.e., approximately twice the electron plasma frequency.

In general, the pump waves propagate in the direction of the electron beam which produces them, much as the wake behind a speeding boat in water. The Rayleigh scattered electrostatic waves have a spatial distribution which is an asymmetric dipole elongated in the direction of the beam. That is, the spatial distribution has two asymmetric lobes, a small backwardly directed lobe and a large elongated forwardly lobe. The maxima of these lobes lie along the direction in which the pump waves are propagating. Since only near "head-on" collisions between pump waves and Rayleigh scattered waves result in Raman emission, it is the interaction of pump waves with the small backwardly directed lobe of the coherent background of Rayleigh scattered waves that is responsible for the Raman emission of transverse electromagnetic waves in a single electron beam-plasma system. The much stronger forwardly directed lobe makes little or no contribution to the Raman emission process.

It is herein proposed to launch two oppositely directed electron beams into a warm plasma such that the transverse electromagnetic power output will be 10 to 100 times the amount obtainable using a single electron beam-plasma system.

With two oppositely directed electron beams, there will be two counter-streaming sets of pump waves and two sets of coherent background charge density fluctuations. Thus, if one set of pump waves is right-directed and the other is left-directed, not only do the right-directed pump waves interact with the right-directed coherent background wave field but also with the left-directed coherent background wave field. The same occurs for the left-directed pump waves which also interact with both sets of coherent background wave fields. It follows, therefore, that there are four distinct interaction processes leading to the Raman emission of transverse electromagnetic waves in a two opposing beam-plasma, whereas there is only one for a single beam-plasma system. Although the input power is doubled (i.e., two beams instead of one), the output power (transverse electromagnetic waves) is at least 10 times greater. Hence, the efficiency of the two opposing beam-plasma system is at least 5 times that of a single beam-plasma system. Moreover, since the forwardly directed lobe of the Rayleigh scattered wave field becomes increasingly stronger than the backward scattered lobe as the phase velocity of the electrostatic waves decrease, their contribution to the Raman process becomes far greater than that of the backwardly directed lobe.

SUMMARY OF THE INVENTION

The invention is a technique and apparatus for producing controlled, coherent, microwave, electromagnetic radiation from a warm, uniform plasma at approximately twice the frequency of the plasma by directing high energy counter-streaming electrons into a plasma and providing means for coupling the energy to appropriate circuitry.

Accordingly, it is a primary object of this invention to provide a method and apparatus for producing high power electromagnetic energy of a controlled nature obtainable from a plasma by utilizing counter-streaming electron beams.

It is another object of this invention to provide a technique and apparatus for producing electromagnetic radiation at approximately twice the plasma frequency with counter-streaming electron beams in a plasma.

It is still another object of the invention to provide an apparatus which directs a pair of counter-streaming high energy electron beams into a plasma and couples the resultant coherent, radiated energy at approximately twice the plasma frequency to external circuitry.

It is a further object of this invention to provide electromagnetic radiation by causing the energy density of Rayleigh scattered longitudinal waves to exceed a certain threshold to stimulate coherent Raman scattering.

It is a still further object of this invention to provide for the generation of electrostatic waves within a plasma whereby the amount of electromagnetic power stimulated by Raman scattering increases with the product of the electron beam power and electron beam current.

It is yet another object of this invention to provide a means for generating transverse coherent electromagnetic waves from 5 to approximately 50 times the electrical efficiency than has been hitherto possible with a single beam or multiples of single beam systems (i.e., more than one beam without counter-streaming).

It is a still another object of this invention to utilize the strong forward scattered lobe of the Rayleigh scattered background wave field to interact with oppositely directed pump waves to produce a power output superior to that which could normally be expected from a multiplicity of similarly directed electron beams wherein the weak backlobe provides the only stimulation of Raman radiation.

These and other advantages, features and objects of the invention will become more apparent from the following description taken in connection with the illustrative embodiment in the accompanying drawings.

BRIEF DESCRIPTION OF THE DRAWINGS

FIG. 1 is a block diagram schematically depicting the conceptualization of this invention;

FIG. 2 is a schematic representation of an embodiment with axially aligned electron beam sources;

FIG. 3 is a schematic representation of a curved path embodiment; and

DESCRIPTION OF THE PREFERRED EMBODIMENTS

Figure 4:
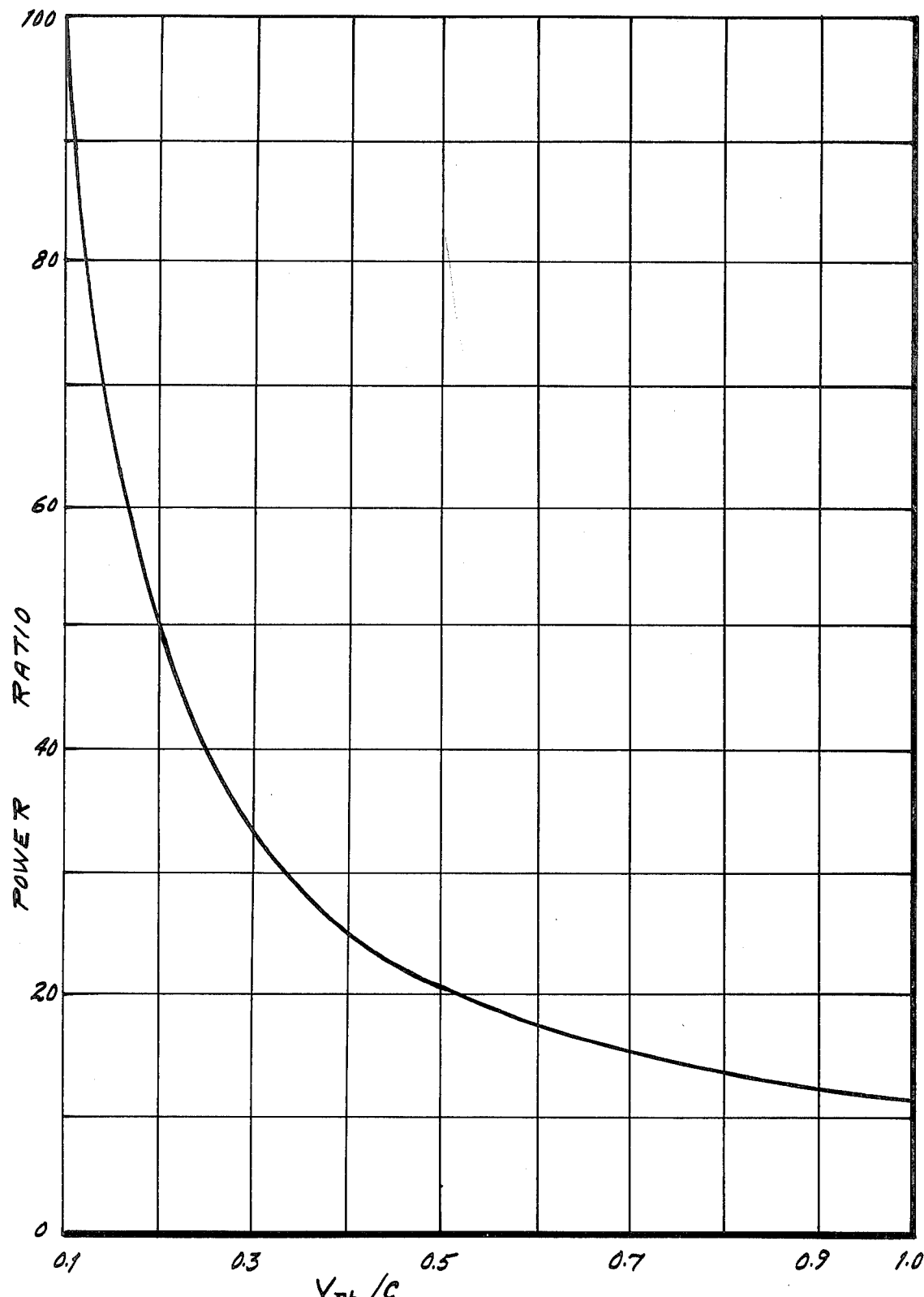
FIG. 4 is a plot of the theoretically predicted ratio of the power outputs of a two beam system to that of a single beam system as a function of the ratio of the phase velocity of the electrostatic waves to the velocity of light in an argon plasma with an electron temperature of 10 electron-volts.

In the Figures like numerals designate like parts. Referring to FIG. 1 there is shown at 10 two sources of oppositely directed high energy electron streams which may be produced by means of electron beams. These sources of directed high energy electrons are applied to a plasma indicated at 12 which may be either discharge generated or electron beam generated. A cavity resonator and coupling to external circuitry is indicated at 14 for obtaining the energy from the system to put it to practical usage. Low frequencies would require conventional electromagnetic cavities, waveguides or coaxial cables while high frequencies could use quasi-optical cavities and either conventional and/or dielectric waveguides.

It is known that the plasma frequency is proportional to the square root of the electron density. Thus, tunable output frequencies may be obtained by varying the plasma electron density, for example, by varying the discharge current density. An axially aligned embodiment of the conceptualization of FIG. 1 is illustrated in FIG. 2 whereby the sources of oppositely directed high energy electrons 10, the plasma at 12 and the coupling arrangement at 14 are applied to blocks correlating these components with those of FIG. 1.

Electron beams are utilized to provide the sources of directed, high energy electrons and comprise two electron beam generating chambers 16, each having therein an electron beam apparatus with a conventional electron beam cathode assembly 18 and a grounded stainless steel electron beam high voltage anode at 20. Forming each of the chambers are sets of opposed nonmagnetic flanges 22 and 24 which comprise the mounts for the cathodes 18 and anodes 20, respectively. Between the flange assemblies 22 and 24 are glass walls 25 sealed with epoxy or to Kovar in a conventional manner. Exhaust ports 26 of each chamber are attached by means of nonmagnetic flanges 28 for connection with a vacuum pump or source of vacuum. Each of the generated electron beams are focused by means of conventional electrostatic focusing (not shown) or by means of a magnetic beam focusing coil 30 which surrounds a stainless steel or other nonmagnetic cylindrical chamber 32, which is secured between the flange assembly 24 and a flange assembly 34, and also by conventional focusing coils (not shown) within the anodes 20. Power is supplied in any conventional manner to the cathode assemblies 18 at 18a for operation of the electron beam generating systems. Simultaneous or alternate pulsing of the beams or DC beams may be employed. Likewise, the basic plasma may be pulsed simultaneously or alternately with respect to the beam pulses or may be run continuously. The devices, thus far described, are conventional and may be purchased off the shelf from a number of companies, e.g., the electron beam devices may be Pierce guns.

It is desirable to have good, broad, thick beams which are more dense on the outer portions of the beams to improve plasma uniformity; however, since the edges of the plasma diffuse to the walls, this is not essential. The beams should also have sufficient penetrating power to go through the tube or cylinder forming chamber 32 and through the length of the plasma chamber indicated at 47. The electron beam densities must be of the order of only a few percent (less than 5%) of the total plasma electron density in order not to create unwanted plasma instabilities and to enhance plasma fluctuations which scatter the electrostatic waves to produce electromagnetic radiation. It is also desirable to keep the collision frequency of the electrons from the sources and plasma with the plasma constituents low and to pulse the beam generating source to obtain high energy and high densities. The pressure of the gas forming the plasma must produce a collision frequency which is significantly lower than the plasma frequency. Large differences are desirable. The collision frequency must be small in order to avoid damping of the electrostatic (Langmuir) waves.

The electron beam sources 10 direct their energy to the plasma at 12 which has a conventional cathode at 40 which may be pulsed or may provide a continuous discharge. Pulsed or continuous power is supplied by means of the wires shown at 42. Nonmagnetic flanges, here shown at 44, provide the mounting for the cathode 40 and the connection with the low loss glass or quartz walls 46 forming the plasma chamber 47. A gas filling valve at 48 connects the chamber 47 with a gas source which may contain any ionizable gas such as argon, neon, etc. The gas should be inert to avoid energy losses and molecular excitation. The plasma utilized must be warm and relatively uniform, i.e., a partially ionized gas consisting of electrons, ions and neutral atoms. In this type of plasma mass and charge density fluctuations give rise to a number of small, locally inhomogeneous regions throughout the plasma volume. The dimensions of the regions are of the order of the volume swept out by the characteristic plasma (known as Debye) length.

The offset portion of chamber 47 of the plasma section 12, which contains the cathode 40, is made an odd multiple of a quarter wavelength in order to prevent the transfer of electromagnetic energy from the plasma into this region. Alternatively, this section could be dimensioned below waveguide cut-off, if the quarter wavelength arrangement is inconvenient. To contain the energy within chamber 47 and form a cavity resonator, the walls 46 may have a metallic reflective coating 46a thereon; however, a portion 46b is left uncoated for the coupling of energy from the cavity. In lieu of the uncoated portion a microwave window could be inserted. Aligned with the uncoated portion 46 and connected with the metallic coating 46a is a waveguide structure 62 for coupling the output to external circuitry. In order that it act as a quarter-wave structure or waveguide beyond cut-off the coating 46a is also applied to the offset portion of chamber 47 containing cathode 40.

The ends of the chamber adjacent the flange assemblies 34 of the electron beam sources 10 may have foil mounts 49 with thin, nonmagnetic, foil material windows 50 therein. The window material may, for example, be of titanium or aluminum foil and would be used to seal the chamber from the high vacuum beamforming region 10. The window materials 50 may be eliminated by utilizing a continuous plasma gas flow with high capacity vacuum pumping at ports 26 (e.g., differential pumping which insures a low pressure in chambers 16 so that electron beams can be generated). The size of the window openings are small (below "cutoff" for microwave propagation) so that all of the microwave energy is reflected into the chamber. Flange shaped stainless steel elements illustrated at 52 are shown secured to the downstream flanges 34, which with the connected elements form the anodes of the plasma chamber 47.

An alternative arrangement is shown in FIG. 3. Here, electron beam forming regions 10 are identical with those shown in FIG. 2; however, the axes of the electron beam sources are displaced from the longitudinal axis of the plasma region 12. This allows for the removal of electromagnetic energy from opposite ends of the plasma region. The displacement of the electron beam sources from the plasma chamber axis is usually at an acute angle so that only relatively small magnetic fields are required to bend the beam for appropriate insertion into the plasma chamber 47. Conventional magnetic coils 70 schematically shown with dashed lines are mounted in pairs parallel to the plane of the drawing of FIG. 3 and would be connected to a source of power (if necessary) in a conventional manner and provide the transverse magnetic field for the bending action.

The coupling of energy from the plasma chamber 47 could be arranged in a manner similar to that of FIG. 2, i.e., a tee type coupling could be placed in the same general position as indicated in FIG. 2.

In this embodiment, as illustrated, coupling is made at the ends of the plasma chamber 47 by means of dielectric microwave windows at 54 which are supported by flange assemblies 56. The dielectric 54 is chosen to extract the maximum amount of the microwave energy generated by the plasma even though part of the energy impinging thereon is reflected into the chamber 47.

The cavity resonator formed by the silvering at 46a of walls 46 and the coupling to external circuitry includes tapered waveguide transitions 60, each of which is connected to a conventional output waveguide 62. An end flange 64 of the transition element 60 is secured to the flange assembly 56 for joinder of this section with the plasma section 12.

The stimulated electromagnetic output from the described systems is inversely proportional to plasma electron temperature to the fourth power and is directly proportional to the second power of energy density of the electrostatic pump waves. The output is also proportional to the sum of the products of the currents and the power of each beam when the current strengths are different. Since the beam electron densities cannot exceed a few percent of the plasma electron density, and since the output frequency is proportional to the square root of this latter density, the maximum attainable power output increases as the fourth power of the output frequency.

The ratio of generated power at about twice the plasma frequency to beam powers is $$\frac{P(\sim 2f_p)}{P(\text{beams})} = K L_b j_b \alpha^9$$

where K = a constant ($\sim 10^{-19}$, depending upon electron and ion temperatures)

$j_b$ = beam current densities (amps/cm$^2$)

$L_b$ = beam lengths in plasma (cms)

$\alpha$ = ratio of electrostatic wave phase velocity to the mean thermal velocity of the plasma electrons From the foregoing it can be seen that the discharge plasma controls the plasma electron density and hence, the ouput frequency. The electron beam current densities and the plasma electron density controls power output.

The threshold above which the energy density of Rayleigh scattered longitudinal background waves becomes intensified and coherent is related to the energy density of the input pump waves. The required threshold pump wave energy level is strongly dependent upon the ratio of the electrostatic wave phase velocity to the mean thermal velocity of the plasma electrons. It is also weakly proportional to the thermal energy density of the plasma ions, and the ratio of the plasma frequency to the effective electron collision frequency. In particular, the threshold energy density of electrostatic pump waves at which coherence occurs is given by:

$$W(\text{threshold}) = A U_i \left(\frac{m}{M}\right) \frac{f_p}{\nu_{\text{eff}}} \alpha^{-6}$$

where

W = energy density of electrostatic waves in the plasma

A = constant ($\sim 3.10^3$)

m = mass of the electron

M = mass of the ion $U_i$ = thermal energy density of the plasma ions $\nu_{\text{eff}}$ = effective collision frequency of plasma electrons $\alpha$ = ratio of electrostatic wave phase velocity to the mean thermal velocity of the plasma electrons $f_p$ = plasma frequency For a representative argon plasma where the electron temperature is of the order of 45,000° K, an ion temperature of 900° K, an electrostatic wave phase velocity of 3(10)$^8$ cm per sec., and an electron density of 1.6 (10)$^9$ per cc., we have $\alpha$ = 2.6, $\nu_{\text{eff}}$ = 1.2(10)$^6$/sec., $U_i$ = 2(10)$^{-4}$ ergs/cc. This leads to a threshold electrostatic pump wave energy density of approximately 6(10)$^{-6}$ ergs/cc.

Thus, there has been described a method and apparatus for producing coherent microwave radiation from a warm, uniform plasma at approximately twice the plasma frequency. This method and apparatus generates two counter-streaming sets of electrostatic waves and two sets of coherent background charge density fluctuations which result in four times as many interactions as for a single beam plasma system. Moreover, two of these interactions are much stronger than the single-beam interaction. Hence, for twice the electron beam power input (i.e., two electron beams) from 10 to 100 times as much electromagnetic power output is attainable. Thus, the overall electrical efficiency for the conversion of electron beam power into electromagnetic output power is more than 5 to 50 times that which would result from the addition of the outputs of two single beam systems as illustrated in FIG. 4 wherein the power ratio for a two beam system is plotted against phase velocity of the electrostatic waves divided by the velocity of light.

Although the invention has been described with reference to particular embodiments, it will be understood to those skilled in the art that the invention is capable of a variety of alternative embodiments within the spirit and scope of the appended claims.

We claim:

1. A method of generating controlled, coherent microwave radiation from a warm, uniform plasma at approximately twice the plasma frequency comprising the steps of counter-streaming a pair of electron beam sources into a plasma to excite longitudinal waves in the plasma such that the energy density level of the said waves is sufficient to stimulate transverse electromagnetic wave radiation at approximately twice the plasma frequency, and coupling said electromagnetic energy for use in appropriate circuitry.

2. An apparatus for producing controlled, electromagnetic, coherent, microwave radiation from a warm, uniform plasma at approximately twice the plasma frequency comprising a plurality of sources of high energy electrons, a plasma having its electron density at least twenty times the electron density from said sources and coupled to said sources for receiving high energy electrons therefrom to produce an electromagnetic wave output, the collision frequency of electrons from said sources and said plasma being considerably lower than the plasma frequency to inhibit damping of the electromagnetic wave output, and means for coupling the stimulated energy from said plasma for its utilization.

3. An apparatus as defined in claim 2 wherein said sources are generally oppositely directed with an axial displacement such that the relationship of said beams to each other at their entrance to said plasma is at an obtuse angle.

4. An apparatus as defined in claim 3 wherein the path of said beams is curved, and magnetic means for bending said beams in said curved path.

5. An apparatus as defined in claim 2 wherein the energy level of plasma oscillation is sufficiently high to cause intensification of microwave radiation from said plasma at approximately twice its plasma frequency.

6. An apparatus for generating controlled coherent microwave radiation from a plasma at twice the plasma frequency comprising two oppositely directed sources of high energy electrons, a plasma, means forming a part of said sources for directing said electrons from each of said sources into said plasma to excite longitudinal electrostatic waves in said plasma such that the energy density level of said waves is sufficient to stimulate transverse electromagnetic wave radiation at approximately twice the plasma frequency, and means for coupling said energy from said plasma.

7. An apparatus as defined in claim 6 wherein said means forming a part of said sources alternately direct said electrons into said plasma.

* * * * *